(12) United States Patent
Mathews

(10) Patent No.: US 12,455,747 B1
(45) Date of Patent: Oct. 28, 2025

(54) PROGRAMMABLE STACKED PROCESSOR WITH SIMULTANEOUS EXECUTION OF ALL PROGRAM STEPS OVER A DATA STREAM

(71) Applicant: Mark Ashley Mathews, Melbourne, FL (US)

(72) Inventor: Mark Ashley Mathews, Melbourne, FL (US)

( * ) Notice: Subject to any disclaimer, the term of this patent is extended or adjusted under 35 U.S.C. 154(b) by 0 days.

(21) Appl. No.: 19/210,515

(22) Filed: May 16, 2025

Related U.S. Application Data

(63) Continuation of application No. 19/190,418, filed on Apr. 25, 2025.

(51) Int. Cl.
  *G06F 9/38* (2018.01)
  *G06F 9/30* (2018.01)
  *G06F 13/28* (2006.01)

(52) U.S. Cl.
  CPC ........ *G06F 9/3889* (2013.01); *G06F 9/30058* (2013.01); *G06F 13/28* (2013.01)

(58) Field of Classification Search
  CPC ..... G06F 9/3889; G06F 9/30058; G06F 13/28
  USPC ........................................................ 712/215
  See application file for complete search history.

(56) References Cited

U.S. PATENT DOCUMENTS

| | | | | |
|---|---|---|---|---|
| 4,754,412 A * | 6/1988 | Deering | .................. | G06F 7/544 708/201 |
| 2010/0023733 A1* | 1/2010 | Moore | ..................... | G06F 9/30 712/E9.017 |
| 2012/0216012 A1* | 8/2012 | Vorbach | ................ | G06F 9/3888 712/E9.003 |
| 2016/0124900 A1* | 5/2016 | Balakrishnan | .......... | G06F 9/383 712/18 |
| 2018/0095758 A1* | 4/2018 | Dubtsov | ............... | G06F 9/3001 |

* cited by examiner

*Primary Examiner* — Chun Kuan Lee
(74) *Attorney, Agent, or Firm* — Donald R. Boys; Central Coast Patent Agengy LLC

(57) ABSTRACT

A computing machine has a plurality of slice processing units (SPUs) coupled in a specific order from a first SPU to a last SPU, each SPU configured to perform a single instruction of a specific algorithm on an incoming value and to pass a resulting output value to a next SPU in the specific order. Values are retrieved from a memory unit by a direct memory access (DMA) controller and passed as input to the first SPU in the specific order, and each value passed begins a new performance of the algorithm executed in parallel with previously submitted values. Each SPU in each clock cycle performs its instruction and passes its result to the next SPU. A result for the algorithm is thus produced in each clock cycle. The SPUs are part of an application specific integrated circuit (ASIC) and may be programmed with instructions.

18 Claims, 4 Drawing Sheets

PROGRAMMABLE STACKED PROCESSOR WITH SIMULTANEOUS EXECUTION OF ALL PROGRAM STEPS OVER A DATA STREAM

CROSS REFERENCED TO RELATED APPLICATIONS

This application is a continuation application of co-pending U.S. application Ser. No. 19/190,418, filed Apr. 25, 2025. All disclosure of the parent application is incorporated at least by reference.

BACKGROUND OF THE INVENTION

1. Field of the Invention

The present invention is in the technical field of digital computing and pertains more particularly to a new and unique computer structure and operation.

2. Description of Related Art

Since the earliest programmable computer systems were introduced, in a typical CPU, coded instructions are fetched usually from sequential locations in a digital memory and executed one at a time with status and values held over in registers from one step to the next. Repeated instructions are implemented by looping back to reread the coded instructions starting from a higher step until all computations are complete. This von Neumann architecture (specifically where the data and instructions are kept in distinct stores) has formed the basis for modern central processing units (CPUs), graphics processing units (GPUs), and tensor processing units (TPUs). CPUs are typically general processors, GPUs are dedicated to graphics, such as images and video, and TPUs are application-specific integrated circuits (ASICs) designed by Google™ for neural networks. TPUs possess specialized features, such as the matrix multiply unit (MXU) and proprietary interconnections.

Generally, all of these different sorts of processors have common limitations that are a result of choices made in relatively early days of computer evolution. This is a natural consequence of design evolution by modifying existing mechanisms and structures. Many computing systems have multiple cores wherein independent processors share resources such as floating-point processing units and memory caches, but the execution of programs is not synchronized between the cores and each core may execute unrelated instruction sequences. This arrangement provides a very versatile design but is not necessarily the most efficient way to execute algorithms where such pervasive versatility is not required.

The inventor posits that a new and non-obvious computing system is needed to maximize efficiency and increase computing power where extremely high throughput is required, and very repetitive sequences of fixed operations may be inherent to algorithm definition. This is a typical case for many forms of encryption, decryption, data integrity, compression, decompression, and cryptocurrency. The normal operations of an Operating System should be handled by a typical CPU whenever the extreme conditions of an algorithm do not present a significant burden.

BRIEF SUMMARY OF THE INVENTION

In one embodiment of the invention a computing machine is provided, comprising a plurality of slice processing units (SPUs) coupled in a specific order from a first SPU to a last SPU, each SPU configured to perform a single instruction of a specific algorithm on an incoming value and to pass a resulting output value, an input memory stream interface coupled to the first SPU in the specific order of SPUs, configured to receive a value from a direct memory access (DMA) controller and to pass the value to the first SPU in the specific order of SPUs, an output memory stream interface coupled to the last SPU in the specific order of SPUs, configured to receive the output value of the last SPU in the specific order of SPUs, and to pass the value to the DMA controller, a set of one or more random access memory (RAM) units coupled to the DMA controller, and a central processing unit (CPU) coupled to the DMA controller, wherein all instruction steps of the specific algorithm are performed in parallel by the plurality of SPUs, and a result of the algorithm is output by the last SPU in the specific order in each clock cycle.

In one embodiment the interconnected SPUs, the input and output memory stream interfaces, and the DMA controller comprise an application specific integrated circuit (ASIC), wherein at least one instruction of an algorithm is preprogrammed into individual ones of the SPUs. Also, in one embodiment one or both of the one or more RAM units and the CPU are a part of the ASIC. In one embodiment algorithms with conditional branches are supported by a skip count passed between SPUs in order, such that if the skip count has a positive value the SPU does not perform the programmed instruction and decrements the skip count by one to the next SPU, and if the skip count is zero, the SPU performs its programmed instruction. And in one embodiment algorithms with conditional branches are further supported by SPUs being preprogrammed with more than one instruction and an integer track number is passed from SPU to SPU, the track number determining which instruction of the more than one instruction is to be performed on the incoming value by the SPU.

In one embodiment the machine further comprises the final result passed to the output memory stream interface is passed back to the DMA controller and written to the at least one RAM unit. In one embodiment the machine further comprises the final result passed to the output memory stream interface is also passed back to the first SPU as a new input value.

In another aspect of the invention a method for calculating an algorithm is provided, comprising providing a plurality of slice processing units (SPUs) coupled in a specific order from a first SPU to a last SPU, each SPU configured to perform a single instruction of a specific algorithm expresses as a sequence of instructions on an incoming value and to pass a resulting output value, coupling the first SPU in the specific order to an input memory stream interface configured to receive a value from a direct memory access (DMA) controller coupled to a random access memory (RAM) and to pass the value to the first SPU, coupling the last SPU in the specific order to an output memory stream interface configured to receive the output value of the last SPU, and to pass that value to the DMA controller, and programming each SPU in the specific order with a different one of the sequence of instructions comprising the specific algorithm; passing values sequentially to the first SPU from the input memory stream interface, and performing all instruction steps of the specific algorithm in parallel by the plurality of SPUs, such that a result of the algorithm is output by the last SPU in the specific order in each clock cycle.

In one embodiment the method further comprises providing the plurality of SPUs as an application specific integrated circuit (ASIC). Also, in one embodiment the method comprises providing the plurality of SPUs, the input memory stream interface and the output memory stream interface as an (ASIC). In one embodiment the method comprises providing the plurality of SPUs, the input memory stream interface, the output memory stream interface, and the RAM as an (ASIC). In one embodiment the method comprises providing the plurality of SPUs, the input memory stream interface, the output memory stream interface, the RAM and a central processing unit (CPU) as an (ASIC). Also in one embodiment the method comprises supporting algorithms with conditional branches by a skip count passed between SPUs in order, such that if the skip count has a positive value the SPU does not perform the programmed instruction and decrements the skip count by one to the next SPU, and if the skip count is zero, the SPU performs its programmed instruction.

In one embodiment the method comprises further supporting algorithms with conditional branches by programming individual ones of the SPUs with more than one instruction and passing an integer track number between SPUs, the track number determining which instruction of the more than one instruction is to be performed on the incoming value by the SPU. In one embodiment the method further comprises passing the outputs of the last SPU in the specific order as results of the algorithm to the output memory stream interface is passed back to the DMA controller and writing the outputs to the RAM. And in one embodiment the method further comprises passing the final result that is passed to the output memory stream interface to the first SPU as a new input value.

DETAILED DESCRIPTION OF THE INVENTION

Figure 1:
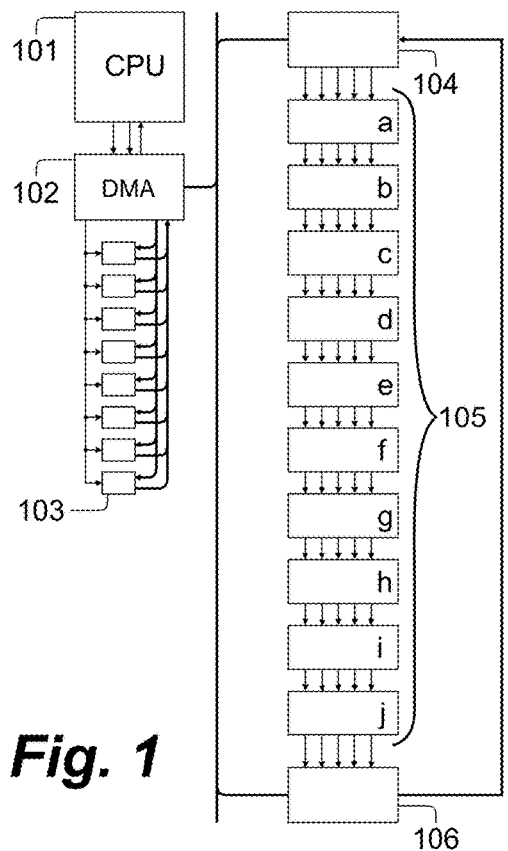
FIG. 1 depicts an overall configuration of a system in an embodiment of the present invention.

Following descriptions teach an integrated circuit that executes a sequence of programming steps in parallel rather than sequentially but retains the ability to have partial results passed from one step to the next. This design in this new invention posits a coordinated sequence, or 'stack' of limited processors the inventor calls Slice Processor Units (SPUs) that do not fetch instructions from memory. One or more pre-selected instructions are installed into individual ones of the SPUs, and in some embodiments each SPU, and the instructions in each SPU that has instructions are executed on each clock cycle when data is available from the previous SPU, or in the case of the first SPU, an input data stream or feedback from the bottom of the stack. Loops are unrolled and each iteration of an instruction is placed in a different SPU of the stack. Each SPU has its own set of data registers, whose values are inherited from a previous SPU and forwarded to the next SPU after making changes according to the SPU's instruction.

An effect of the instructions implemented in the stack of SPUs is effectively the same as they would be for a typical fetch and execute single core with a distinction that, instead of instructions modifying the data register values of that core over time, the instructions modify the values passed down the stack of SPUs. Instead of many clock cycles required for a single core to produce a single result, the stack of SPUs produces one result per clock cycle, realizing a corresponding increase in throughput.

While the latency in clock cycles from the time a data item is taken in, to the time a corresponding result is produced depends on the number of slices the data passes through, the throughput is set to one clock cycle per output, limited only by the rate that data can be delivered. Some algorithms operate linearly without branches such as the well-known and pervasive SHA256 used in cryptocurrencies. Other algorithms have conditional operations, typically expressed as "if . . . then . . . else . . . " constructs in computer languages, whereupon one of several branches is executed depending on circumstances expressed in numeric or logical values of preliminary computations.

An algorithm design for a stack of SPUs supports conditional execution in two distinct ways. The first way is by skipping operations of a contiguous set of SPUs using a skip count. On detection of a condition that obviates the need to execute a subsequence of instructions, the skip count is set to the number of instructions, and hence the number of SPUs, that are to be skipped. Each SPU receives the current skip count from the previous SPU. If the skip value is not zero, the operation of that SPU is suppressed and the skip count that is passed to the next SPU is reduced by one.

If the skip value is zero, then the SPU operates normally. To implement a typical "if . . . then . . . else . . . " conditional execution, if the conditional clause is met, no skip count is set and the "then" clause operations are executed immediately following the current SPU. At the end of the "then" clause an unconditional skip of the "else" clause is initiated. If the condition clause is not met, the "then" clause is skipped, and execution is resumed when the "else" clause operations are reached.

With each individual consideration of status bits tested by the operations, the decision to proceed with the "then" clause or the "else" clause is made specifically for that streaming program execution as it passes down through the stack of SPUs. Some executions may be moving down one branch while simultaneously other executions are moving down an alternative branch. This implements the algorithm in a way that exactly corresponds to the execution of a sequentially based program in a standard CPU that does not make use of backwards branches or loops.

This mechanism may be indefinitely recursive. If one clause of a conditional is executed, it may have subclauses that are conditionally executed or skipped based on the single skip count, as it is not otherwise in use for an executed clause. Conversely, in a conditional clause that is skipped, the skip count will not be zero and the conditional operations that would select one or another subclause are not executed, and the skip count is decremented and passed down without disturbance.

While this method is quite versatile, it is not necessarily the most efficient method, as SPUs are dedicated to one clause or another, and for any given streaming execution passing down the stack, one section or the other will be quiescent. This is not the most optimal use of the limited set of SPUs extant in the system as a whole.

An alternative method of conditional execution is to implement multiple tracks of instructions. Storage of instructions in this circumstance is expanded such that each SPU contains more than one preloaded instruction to execute, controlled by an incoming track number. The differing instructions that implement the multiple clauses are loaded into different tracks of the same SPU such that the SPU will execute one instruction or another depending on which track it is "on" for any given cycle, and fewer SPUs will be idle. Since the number of SPUs dedicated to the conditional operation is some fixed number, the shorter of two tracks will end with a skip to get to the common point. Nested conditionals may be implemented by switching tracks further and the general skip mechanism may be used if the number of tracks is insufficient for a complex set of conditionals.

In this way, the number of tracks implemented in an ASIC can be chosen based on statistics of the expected algorithms and extended when required by the skipping mechanism, as opposed to having a fixed limit of possible paths beyond which an algorithm cannot be implemented.

Returning the output of the final slice to the first slice in lieu of new data allows the tracking mechanism to implement programs that are larger than the implemented stack size. Reusing the slices in this way reduces the number of SPUs required for a given program at the cost of throughput. Each single pass through the stack will take a single clock cycle per datum presented with a corresponding multiple of latency.

It should be clear that not all algorithms can (or should) be adapted to this scheme and that circumstance is compatible with the intent of this Invention. This new design should be used where very high throughput is required and very repetitive sequences of fixed operations are inherent to the definition of the algorithm. This is a typical case for many forms of encryption, decryption, data integrity, compression, decompression, and cryptocurrency, among possibly other forms of computing. The normal operations of an Operating System should be handled by a typical CPU whenever the extreme conditions of an algorithm do not present a significant burden.

FIG. 1 depicts an overall configuration of a system according to an embodiment of the invention. A stack of Slice Processor Units (SPUs) 105 is configured such that each SPU executes one of several preloaded instructions on each clock cycle whenever input data is available. Instructions are never fetched from Random Access Memory (RAM), rather instructions are preloaded before the program is executed and are not altered during execution. The entire contents of the data registers are passed from one SPU to the next, along with program status bits and other internal states. As the results of each program step are completed, they are passed down to the next program step. The net result is that each step of the algorithm is executed simultaneously with all others; but they each operate on data received at a distinct and different point in time. The throughput is thus synchronized with the input data rate. While the stack illustrated in FIG. 1 shows only 10 SPUs, the number of SPUs in a robust implementation would typically be in the thousands. The standard SHA-256 algorithm can be implemented in a stack of less than 2,000 SPUs.

An input memory stream interface 104 and an output memory stream interface 106 are connected to a Direct Memory Access (DMA) controller 102 which manages data to and from a set of RAMs 103 which may be internal or external to the ASIC. DMA controller 102 also provides access to a system controller CPU 101 which also may be internal or external to the ASIC. The system controller CPU provides general housekeeping functions as well as executing algorithms that are not suited to the constraints of the stacked SPU form.

Figure 2:
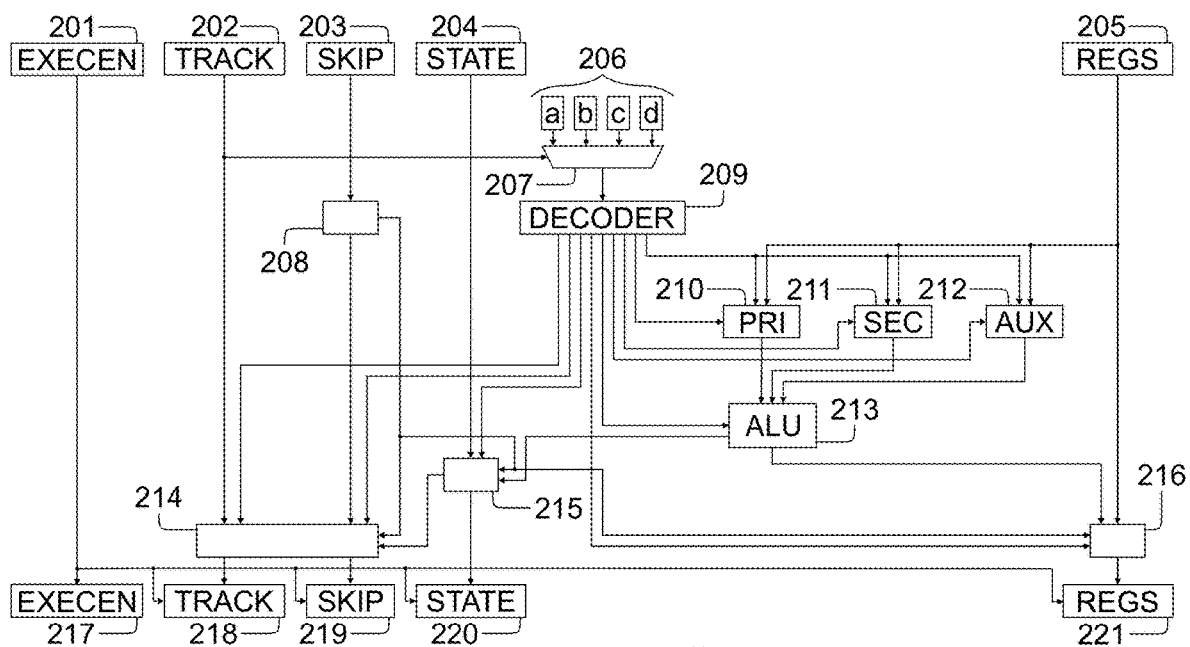
FIG. 2 shows a typical configuration for each slice processor unit (SPU) in the system of FIG. 1 in an embodiment of the invention.

FIG. 2 shows a configuration for each SPU in stack 105 in one embodiment of the invention. A master operation execution enable (EXECEN) 201 signal indicates data from the previous SPU is available and enables computations to proceed (when not suppressed by slice skipping) and output registers to accept new results. Track number 202 signal from the previous SPU selects which track this SPU is on, and is updated each clock cycle, as described above. Skip count 203 signal denotes how many SPUs should be skipped until execution resumes and is used to extend the conditional execution mechanism when there are insufficient distinct tracks available to accommodate an algorithm. Algorithmic status bits 204 control the conditional execution path. Register values 205 provide the current algorithmic register values. A multiplexor 207 uses the track number to dynamically select one of the preloaded instructions 206 and forwards the instruction currently selected to an instruction decoder 209 which demuxes the instruction word into control signals for the various function blocks which includes at least a single cycle Arithmetic Logic Unit (ALU) 213. Control signals from the instruction decoder are used by register select logic 210 to determine which register value 205 from the previous SPU, or arbitrary constant from the instruction, or limited constant such as zero or one, to pass forward as primary value to the ALU. Likewise, register select logic 211 determines the secondary value and register select logic 212 determines the auxiliary value.

Arbitrary constants are extracted from the instruction code by instruction decoder 209 and limited constants such as zero are determined by using invalid register indices to indicate which of several limited specific constants are to be used. This allows both one arbitrary constant and multiple limited constants to be used by the same instruction.

ALU 213 executes single cycle operations such as addition, logical AND, OR, and XOR along with post alignment and numeric shifting of the operation results. Both the operation and the output register index are received from the instruction decoder and the results of the operation are passed along with the output register index to operational register storage controller 221. Subtraction is not included in this typical implementation because register select logic elements 210, 211, and 212 may be instructed to negate their input value by the instruction decoder 209. Carry and zero status bits reflecting the results of the operation are passed from ALU 213 to algorithmic status propagation logic 215 which is enabled by decoder 209 to override or retain algorithmic status bits 204 from the previous SPU and forward them to output algorithmic status register 220 and conditional branch controller 214 which determines if the track number 202 from the previous SPU should be retained or replaced with a new track number and skip count from instruction decoder 209.

Conditional branch controller 214 accepts the branch control signal from algorithmic status propagation logic 215 and uses the result to determine if the track number is altered and skip count is altered. The altered or retained track number is output to track number register 218 for transmission to the next SPU.

Skip count 203 suppresses execution of the SPU when it is non-zero, allowing only register and status forwarding and multi-stage operations (not shown in this embodiment) to proceed. Conditional decrement and zero detect circuit 208 reduces the incoming skip count by one when the count is greater than zero and suppresses all functionality when the incoming skip count is not zero. Decremented skip value from conditional decrement and zero detect circuit 208 is output to skip count register 219 for transmission to the next SPU unless replaced by a new skip count value from instruction decoder 209.

Status bits output from algorithmic status propagation logic 215 are passed to the next SPU via output algorithmic status register 220.

Output numeric value of ALU 213 is written to the target register indicated by instruction decoder 209 by register value replacement logic 216 which promotes prior values from register values 205 for each algorithmic register not specifically targeted for alteration to register storage controller 221.

EXECEN 201 signal is propagated to operation execution enable output register 217 and enables output clocked registers for track number register 218, skip count register 219, algorithmic status register 220, and register storage controller 221.

Figure 3:
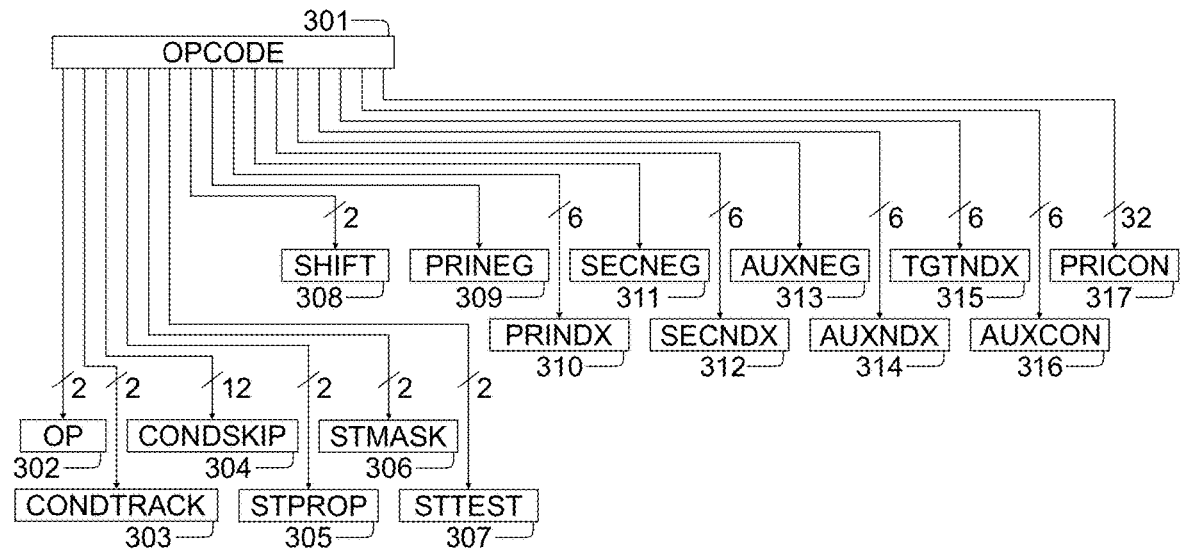
FIG. 3 shows the typical breakout of fields from an instruction word in an embodiment of the invention.

FIG. 3 shows the typical breakout of bit fields in the instruction decoder 209. The selected instruction word 301 from multiplexor 207 is decomposed to provide various bit fields to other components. The number of bits in each field will vary to conform to the indexing and numeric requirements of the SPU.

Operation code 302 selects the base operation of ALU 213. Status mask bits 306 are combined with the output status bits of ALU 213 and then compared to status test bits 307 to determine if conditional track number 303 and conditional skip count 304 should replace the values from the previous SPU. Status propagation bits 305 indicate which status bits from ALU 213 are propagated to the next SPU and which are retained from the previous SPU.

Shift mode 308 determines how the ALU will post process the computed result. Primary register index 310 indicates which register value or constant is to be used as primary value of ALU 213 and primary negation flag 309 indicates if that value should be negated. Secondary register index 312 indicates which register value or constant is to be used as secondary value of ALU 213 and secondary negation flag 311 indicates if that value should be negated. Auxiliary register index 314 indicates which register value or constant is to be used as auxiliary value of ALU 213 and auxiliary negation flag 313 indicates if that value should be negated. Target register index 315 indicates which register is to receive the result from ALU 213 and may be an invalid or constant index to indicate the result is discarded and only affects status bits.

Primary constant value 317 is a full width constant sufficient to set the value of an algorithmic register and auxiliary constant value 316 is a limited width constant sufficient to indicate the range of shifts and rotates. Primary constant value 317 provides the constant value to register select logic 210 and 211 and auxiliary constant value 316 provides the constant value to register select logic 212.

Figure 4:
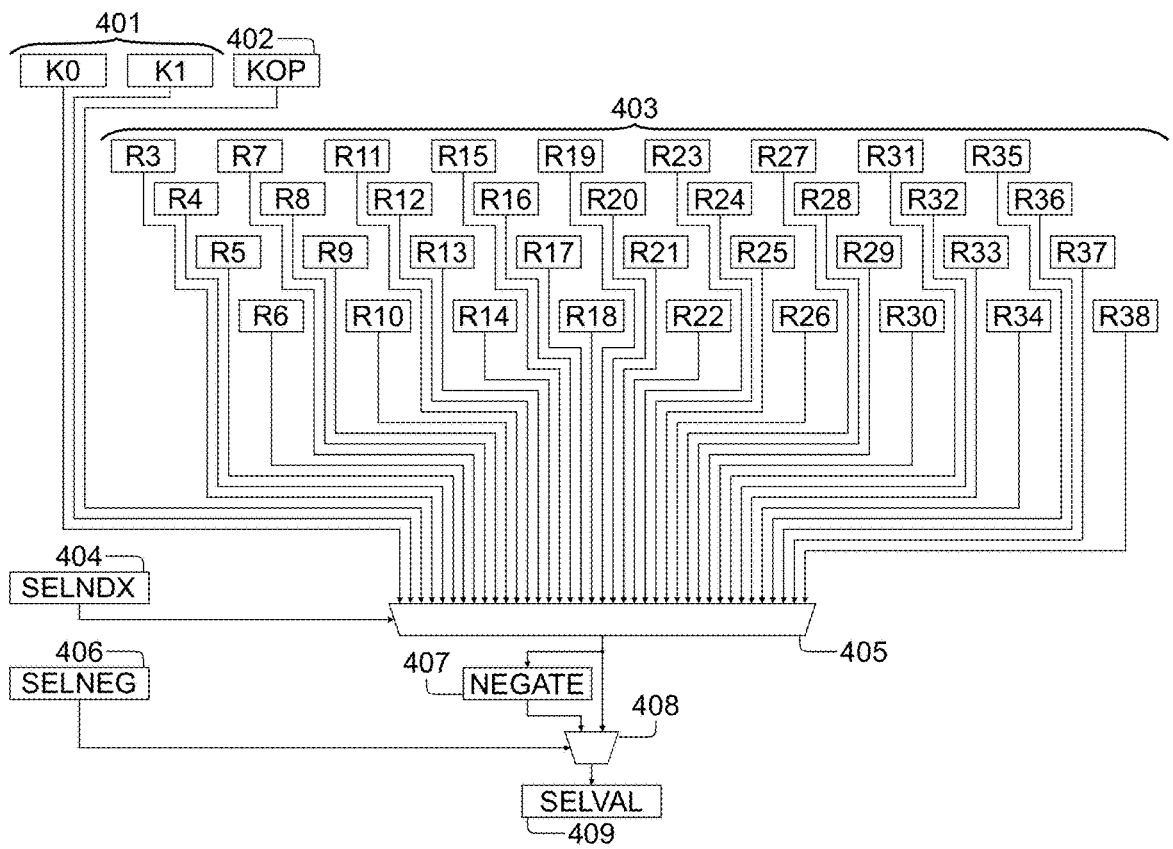
FIG. 4 illustrates register select logic for determining primary, secondary, and auxiliary values used by logical and numeric operations in an embodiment of the invention.

FIG. 4 shows the logic used to determine the values of primary 210, secondary 211, and auxiliary 212 register select logic elements respectively used by ALU 213. Multiplexor 405 selects one of the register values 403 passed forward by the previous SPU, or for the first SPU, the input memory stream interface 104, or alternatively one of the fixed constants 401, such as the values for 1 or 0, or the singular constant 402 extracted from the instruction word by instruction decoder 209. Choice of value is indicated to multiplexor 405 by a register index 404 from instruction decoder 209. Selected value from multiplexor 405 is negated by logic 407 and either the original or negated value is selected by multiplexor 408 as indicated by a negation flag 406 from instruction decoder 209. Resulting value 409 is then used as the selected value for each of the primary 210, secondary 211, and auxiliary 212 register select logic elements.

Figure 5:
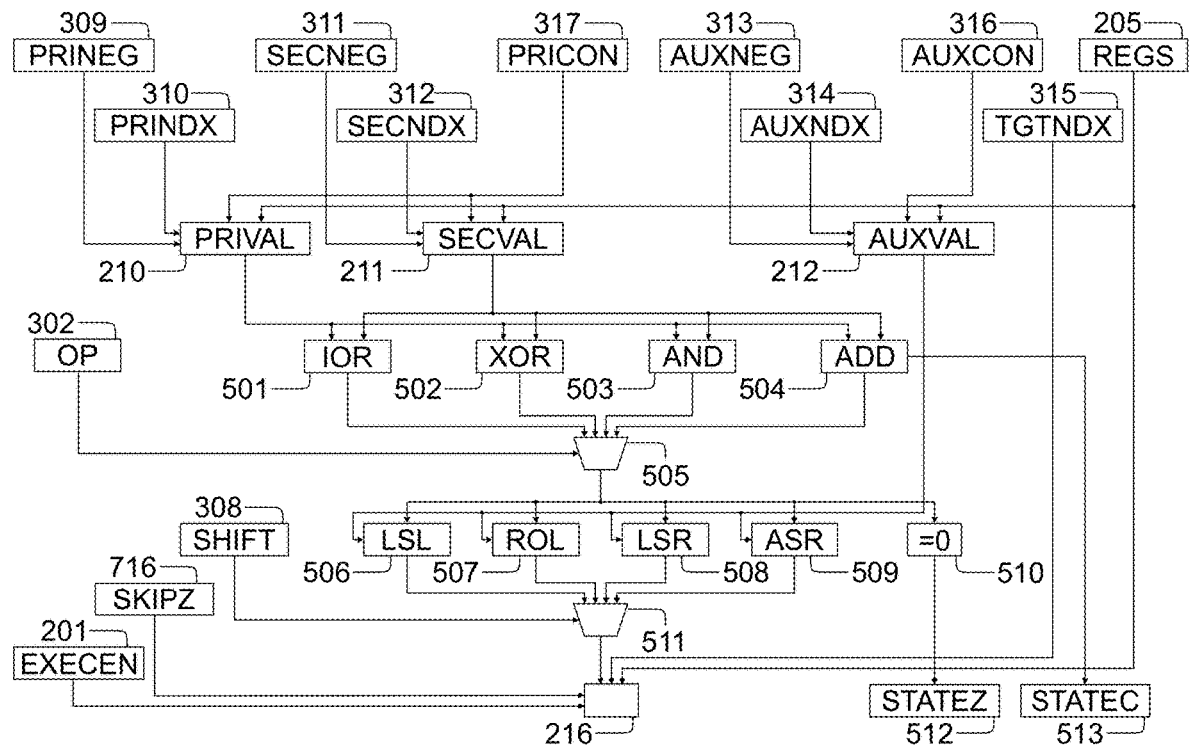
FIG. 5 illustrates internal details of an arithmetic logic unit (ALU) that implements instructions for each SPU in an embodiment of the invention.

FIG. 5 shows internal details of ALU 213 that implements instructions for each SPU in stack 105. The instruction selected by multiplexor 207 is broken into distinct fields and presented as various interfaces. Primary value is provided by register select logic 210 according to primary register index 310 and primary negation flag 309. Secondary value is provided by register select logic 211 according to secondary register index 312 and secondary negation flag 311. Auxiliary value is provided by register select logic 212 according to auxiliary register index 314 and auxiliary negation flag 313.

Target register index 315 indicates which register receives the ALU 213 result value to register value replacement logic 216 and register values 205 provide the values for algorithmic registers that are not so targeted. Bitwise inclusive-or logic 501 provides the IOR function of the primary and secondary values, bitwise exclusive-or logic 502 provides the XOR function, bitwise conjunction logic 503 provides the AND function, and adder 504 provides the sum of the values and the carry status bit 513.

Operation code 302 indicates which computation function is selected by multiplexor 505 which provides the value to logical shift left logic 506, roll left logic 507, logical shift right logic 508, and arithmetic shift right logic 509. Shift mode 308 indicates which shifted or rolled value is selected by multiplexor 511 to be passed on to register value replacement logic 216. Skip zero detected 716 (See FIG. 7) is used by register value replacement logic 216 to force values from register values 205 to be passed unchanged and EXECEN 201 signal indicates when values are to be clocked into register value replacement logic 216.

Zero test logic 510 takes the selected value from multiplexor 511 and outputs a corresponding signal to zero status bit 512.

Figure 6:
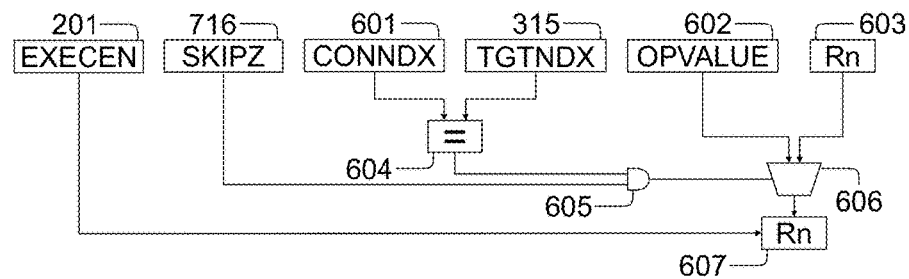
FIG. 6 illustrates internal support for each program register contained with register write control logic in an embodiment of the invention.

FIG. 6 shows internal support for each program register contained within register value replacement logic 216. A single constant register index 601, ostensibly the same used to access source registers in the instruction word, is compared to target register index 315 by comparator 604. If the indices are identical, AND gate 605 combines with skip zero detected 716 (See FIG. 7) and selects the value 602 from ALU 213 via multiplexor 606 whenever the skip count is zero and the indices are identical, otherwise the value 603 of that algorithmic register from the previous SPU is retained through to the next SPU and clocked into output register 607 when enabled by EXECEN 201 signal. Any algorithmic register not selected by target register index 314 always has the corresponding value 603 from the previous SPU retained by multiplexor 606 through to the next SPU via output register 607. When target register index 314 is all zeros, as is the case after system reset, no replacement register is selected and the instruction word is interpreted as a no-operation code if status propagation bits 305 are also zeros.

Figure 7:
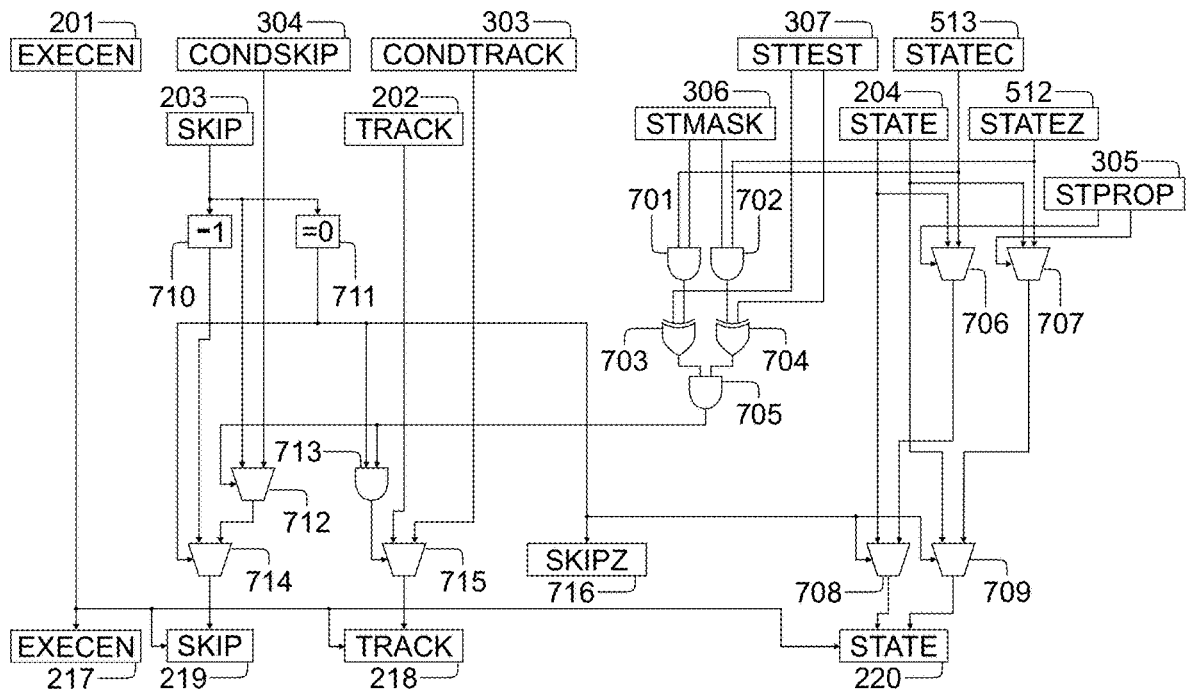
FIG. 7 shows a typical implementation of the propagation of algorithmic status bits and control of conditional execution in an embodiment of the invention.

FIG. 7 shows a typical implementation of conditional decrement and zero detect circuit 208, conditional branch controller 214, and algorithmic status propagation logic 215 for a system supporting two status bits, zero status bit 512 and carry status bit 513 from ALU 213.

Skip count 203 is passed to decrement logic 710 and zero detect logic 711. When zero detect logic 711 indicates the incoming skip count value is non-zero, it forces multiplexor 714 to pass the reduced value from decrement logic 710 to the skip count register 219 enabled by EXECEN 201 signal. When zero detect logic 711 indicates the incoming skip count value is zero, it forces multiplexor 714 to pass the value from multiplexor 712 instead.

Status propagation bits 305 cause multiplexors 706 and 707 to select algorithmic status bits 204 when each individual control bit is low or zero status bit 512 and carry status bit 513 respectively from ALU 213 when each corresponding control bit is high. Multiplexors 708 and 709 are controlled by output of zero detect logic 711 to select algorithmic status bits 204 from previous SPU when incoming skip count 203 is non-zero and the outputs of multiplexors 706 and 707 respectively when skip count 203 is zero. The outputs of multiplexors 708 and 709 are clocked into output algorithmic status register 220 when enabled by EXECEN 201 signal.

Status mask bits 306 provide individual bit selects to AND gates 701 and 702 which are combined with the outputs of multiplexors 706 and 707 respectively and are forwarded to XOR gates 703 and 704 to determine if they differ from status test bits 307. AND gate 705 asserts a logical high when all bits selected by status mask bits 306 differ from status test bits 307 to effectuate a branch. This choice of polarity provides for no branch taken when all bits of the instruction word are zeros, as is the case after system reset.

Output of AND gate 705 is combined by logic 712 to pass conditional skip value 304 to multiplexor 714 when output of AND gate 705 is asserted and an all zero skip count when output of AND gate 705 is de-asserted.

Output of AND gate 705 is also combined with output of zero detect logic 711 by AND gate 713 to multiplexor 715. Multiplexor 715 will select track number 202 from previous SPU when output of AND gate 705 is de-asserted or incoming skip count 203 is non-zero. The output of multiplexor 715 is clocked into track number register 218 when enabled by EXECEN 201 signal to provide the outgoing track value for the next SPU.

Output of zero detect logic 711 is provided via skip zero detected 716 signal to register value replacement logic 216 (See FIG. 5) and AND gate 605 (See FIG. 6).

Figure 8:
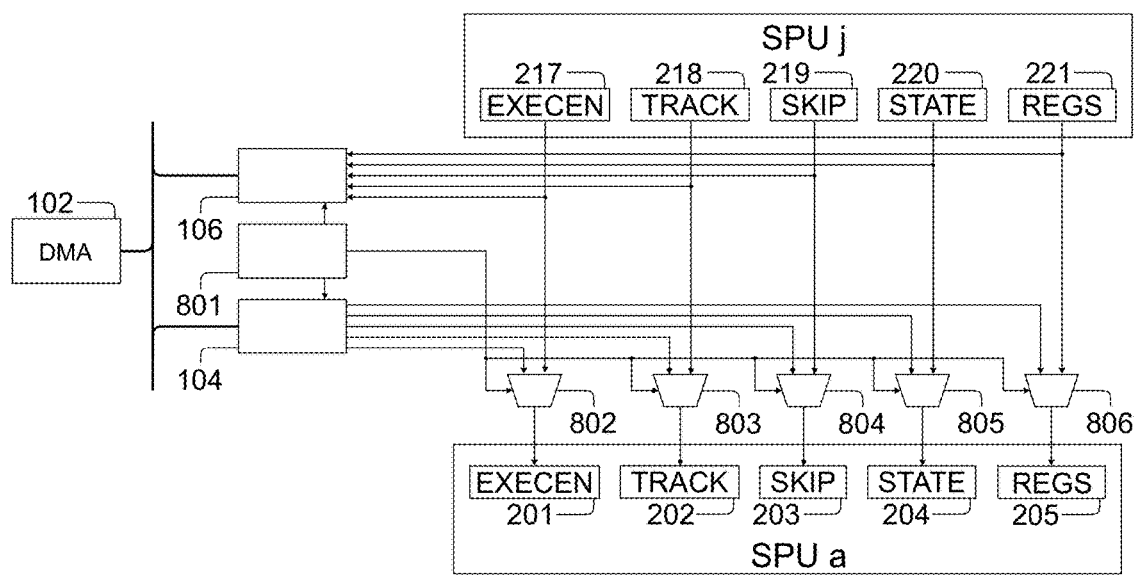
FIG. 8 shows circuitry for recirculating results on demand in an embodiment of the invention.

FIG. 8 shows an arrangement of additional logic that allows for the output of the last slice to continuously be passed in as input to the first slice for additional processing.

Input memory stream interface 104 accepts data from the DMA controller 102 and presents it to multiplexors 802, 803, 804, 805, and 806 where it becomes the initial input to the first SPU in the stack 105 under control of logic 801. When desired, original data from input memory stream interface 104 may be supplemented by the final outputs of the last SPU in the stack 105 under control of logic 801 in place of, or in addition to, directing said outputs to output memory stream interface 104 for recording into RAM.

Logic 801 may use counters, data states, or any other means to determine when data should be written to memory and when it should be sent back to the stack of SPUs for further processing.

Data processed in this way could be passed through the stack starting with one initial track, and then reprocessed through the stack as many times as desired on differing tracks, limited only by the number of tracks in the implementation. This would allow the reuse of the stack by expanding the tracks and result in a net reduction in the physical size of the circuit required to execute a given algorithm.

The instructions may be placed in the instruction word registers by any method convenient to the implementation, such as shifting in instructions from one SPU to the next or directly accessing each individual SPU. The former has the advantage that the physical tile of each SPU is identical and the latter the advantage of being able to make small adjustments in the program without loading all SPUs in the stack. The implementation may use any of a variety of methods that best suits the design constraints.

Numerous extensions to this basic design are envisioned including, but not limited to, multistage processors for fixed and floating point multiplication, division, and addition; multiple simultaneous logical operations into distinct operational register targets, matrix support operations, and transcendental functions.

It will be apparent to the skilled person that the embodiments described in the disclosure are exemplary only and are not limiting to the scope of the invention. The skilled person will be aware that many alterations may be made within the scope of the invention, which is limited only by the claims.

The invention claimed is:

1. A computing machine, comprising:
   a plurality of slice processing units (SPUs) coupled in a specific order from a first SPU to a last SPU, each SPU having a plurality of data registers, an instruction word register, and an Arithmetic Logic Unit (ALU);
   an input data stream interface coupled to the first SPU, configured to receive input values and to pass the input values to the first SPU in the specific order of SPUs; and
   an output data stream interface coupled to the last SPU, configured to receive output values from the last SPU in the specific order of SPUs
   wherein instruction words are preprogrammed into the instruction word registers of the SPUs, simultaneous processing in each SPU is controlled by decoding the instruction words into control signals for various function blocks including the ALU, and all data register values are passed forward after processing in each active cycle.

2. The computing machine of claim 1 further comprising a direct memory access controller (DMA controller) coupled to both the input and the output data stream interfaces, a set of one or more random access memory (RAM) units, and to a central processing unit (CPU).

3. The computing machine of claim 2 configured as a programmable application specific integrated circuit (ASIC).

4. The computing machine of claim 2 wherein the output values of the last SPU are passed to the DMA controller and written to the one or more RAM units.

5. The computing machine of claim 2 wherein the output values of the last SPU are passed to the first SPU as new input values.

6. The computing machine of claim 1 configured as a programmable application specific integrated circuit (ASIC).

7. The computing machine of claim 1 further comprising a skip count number passed from SPU to SPU in order, such that if the skip count has a positive value the SPU does not perform the programmed instruction and decrements the skip count by one to the next SPU, and if the skip count is zero, the SPU performs it's programmed instruction.

8. The computing machine of claim 1 further comprising a plurality of instruction word registers and an integer track number passed from SPU to SPU in order, the track number determining which instruction word of the more than one instruction word is to be performed on the incoming values by the SPU.

9. A method for computing values for an algorithm having a specific number of computational steps in an order, first to last, comprising:
  coupling a number of slice processing units (SPUs), equal to the number of computational steps in a stack, each SPU having a plurality of data registers, an instruction word register, and an Arithmetic Logic Unit (ALU);
  configuring each SPU in the ordered stack to execute one of the computational steps in the order, such that the first SPU performs the first computational step, the last SPU performs the last computational step, and the SPUs in order perform the computational steps in the order, simultaneously; and
  configuring each SPU in the ordered stack to receive a digital input, perform the computational step and to output a digital result of the computational step performed;
  wherein the first SPU in the ordered stack receives a digital value, performs the first discrete computational step in the specific order, and outputs a result of the first computational step as an input to the second SPU in the ordered stack, each SPU in order in the ordered stack performs a discrete computational step according to the order of the discrete computational steps, passing a result to the next SPU in the ordered stack, and the last SPU in the ordered stack performs the last computational step and outputs a digital value as a result of the algorithm.

10. The method of claim 9 further comprising connecting the first SPU to an input data stream interface, the last SPU to an output data stream interface, the data stream interfaces to a direct memory access (DMA) controller connected to a central processing unit (CPU).

11. The method of claim 9 further comprising configuring each SPU in the ordered stack to execute one of the computational steps by programming an instruction word into each instruction register in each SPU, the instruction word specific to the ordered step of the SPU, wherein the instruction word, decoded, provides control signals to control functions of the SPU to execute the computational step.

12. The method of claim 10 comprising streaming input values from memory to the first SPU, passing results of the execution of the computational step in each SPU simultaneously to the following SPU in the order, and streaming output of the last SPU to RAM.

13. The method of claim 9 comprising configuring the interconnected SPUs, the input and output data stream interfaces and the DMA controller as an application specific integrated circuit (ASIC).

14. The method of claim 9 comprising supporting algorithms with conditional branches by configuring each SPU with a plurality of instruction word registers, programming each instruction word register with an instruction word, and passing an integer track number between SPUs, such that the track number is used to select the instruction word to be executed in each SPU.

15. The method of claim 9 further comprising passing the outputs of the last SPU in the order to the output data stream interface and writing the outputs to the RAM.

16. The method of claim 9 further comprising passing the outputs of the last SPU in the order to the first SPU as a new input value.

17. The method of claim 9 comprising configuring the interconnected SPUs, the input and output data stream interfaces, the DMA controller and the CPU as an application specific integrated circuit (ASIC).

18. The method of claim 9 comprising supporting algorithms with conditional branches by a skip count passed between the SPUs in order, such that if the skip count has a positive value the SPU does not perform the programmed instruction word and decrements the skip count by one to the next SPU, and if the skip count is zero, the SPU performs its programmed instruction word.

* * * * *